Feb. 26, 1924.

J. A. GRASSMAN

LAWN MOWER SHARPENER

Filed Oct. 10, 1921

Inventor
J. A. GRASSMAN,

By Munn & Co.

Attorney

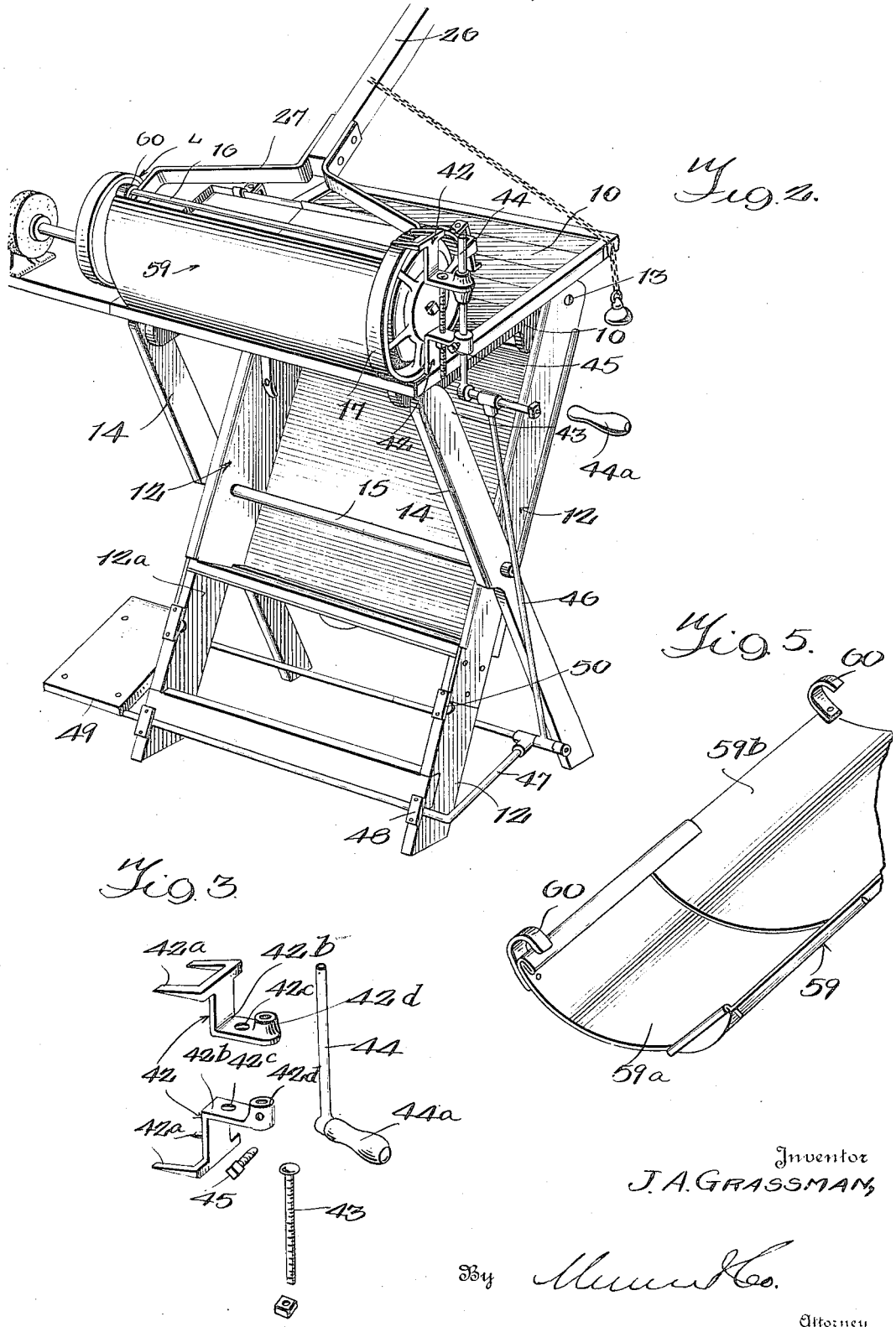

Feb. 26, 1924.  
J. A. GRASSMAN  
LAWN MOWER SHARPENER  
Filed Oct. 10, 1921  
1,484,708  
3 Sheets-Sheet 3
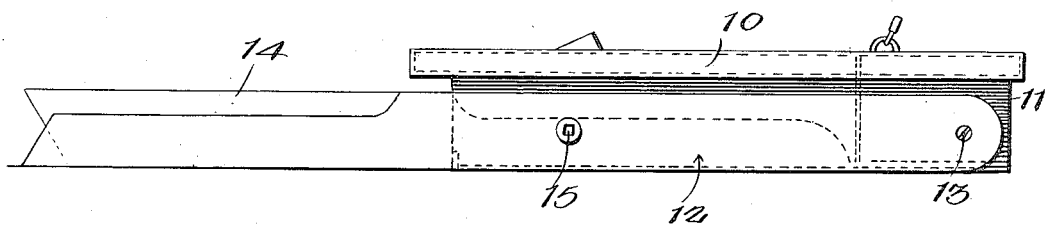
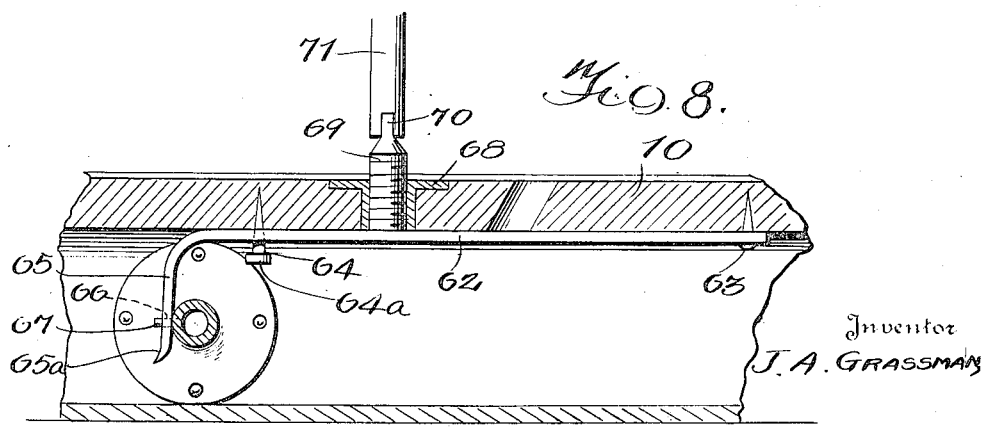

Patented Feb. 26, 1924.

1,484,708

UNITED STATES PATENT OFFICE.

JOHN ADAM GRASSMAN, OF PALMYRA, PENNSYLVANIA; JOHN ADAM GRASSMAN ADMINISTRATOR OF SAID JOHN ADAM GRASSMAN, DECEASED.

LAWN-MOWER SHARPENER.

Application filed October 10, 1921. Serial No. 506,787.

*To all whom it may concern:*

Be it known that I, JOHN ADAM GRASSMAN, a citizen of the United States, and a resident of Palmyra, in the county of Lebanon and State of Pennsylvania, have invented certain new and useful Improvements in Lawn-Mower Sharpeners, of which the following is a specification.

The present invention relates to an improvement in lawn mower sharpeners.

One of the principal objects of the present invention is to provide an improvement in lawn mower sharpeners which effects a proper grinding or sharpening of the cutters of the revolving reel and of the ledger plates or fixed cutter without disassembling these elements and without requiring the exercise of special skill; which is portable and possessed of the capacity for the necessary adjustments; and which is in general of simple and durable construction, reliable in operation and easy and inexpensive to manufacture.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 2 is a similar view, showing the invention equipped with a convertible hand or foot drive;

Figure 3 is a group view in perspective, illustrating the hand drive of Figure 2;

Figure 5 is a detail perspective view of the emery apron or receiver;

Figure 7 is a view in elevation, showing the machine folded up; and

Figure 8 is a fragmentary detail view in section of the latching means.

Figure 1:
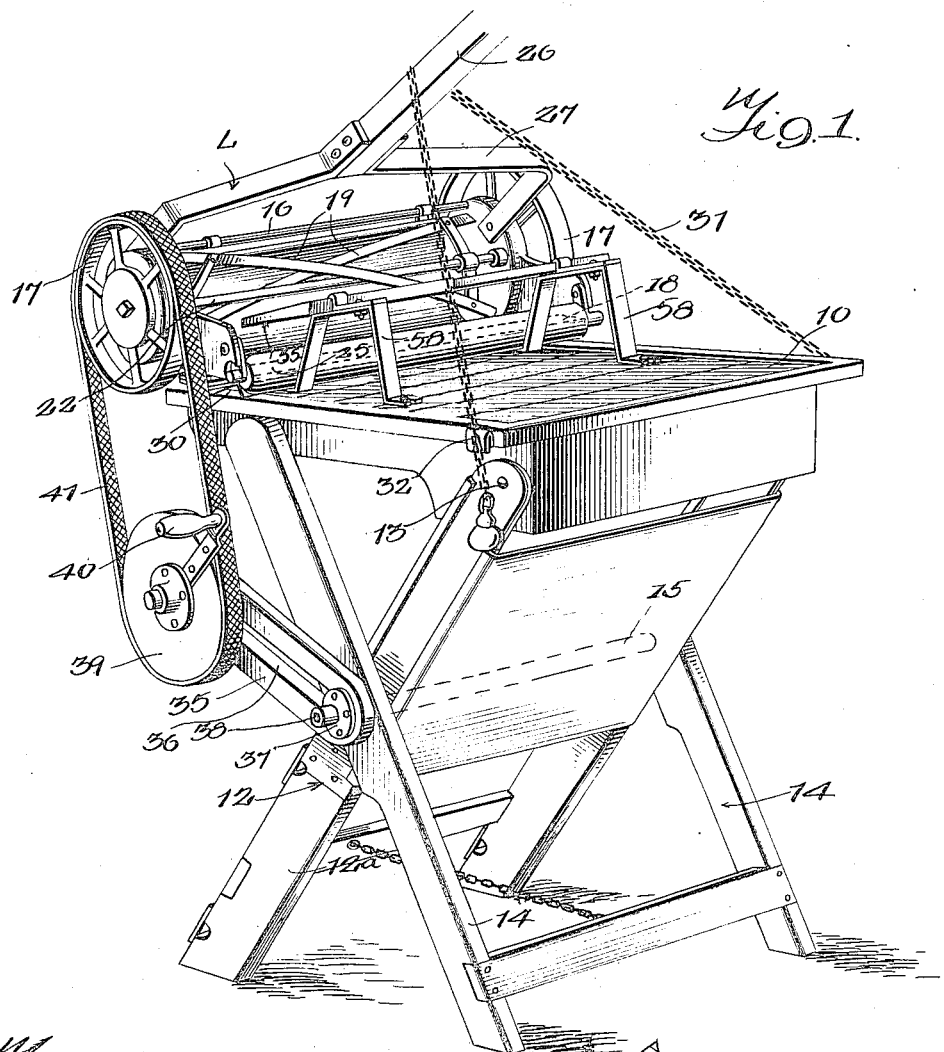
Figure 1 is a perspective view of an embodiment of the invention in use in sharpening a lawn mower.

Referring to the drawings wherein for the sake of illustration is shown the preferred embodiment of the invention, the numeral 10 designates a table or support having a frame 11 on the underside thereof. A pair of legs 12 is pivotally connected to the frame 11 as at 13, the legs 12 including removable sections 12ª, and a pair of legs 14 is pivotally connected with the legs 12, by means of a shaft 15, the pairs of legs crossing and the upper ends of the pair of legs 14 engaging the underside of the table 10 whereby the legs constitute a base upon which the table or support is mounted.

The lawn mower to be sharpened is designated generally at L and may be of any conventional type. Preferably it includes a frame 16, rotatable ground or traction wheel 17, a fixed cutter or ledger plate 18, a rotary cutter of the reel type including a plurality of cutters 19 and driving mechanism for the rotary cutter including internal gears 20 provided on the ground wheels and pinions 21 coacting therewith, the pinions being connected with the shaft 22 of the rotary cutter by suitable ratchet mechanism such as a ratchet 23 and a sliding pawl 24 operating in a transverse slot provided in the cutter shaft 22. The lawn mower also includes an adjustable gauge roller 25 and a handle 26 connected with the frame of the machine by a bail 27.

Prior to mounting the lawn mower on the table for the sharpening operation the ratchet mechanism is reversed so that the rotary cutters will traverse the ledger plate in a direction opposite to that in which they move during the cutting operation. This may be accomplished by removing the ground wheels and the ratchet mechanism and placing the ratchet mechanism of one side on the other side of the machine and vice versa. For instance, the ratchet mechanism on the right-hand side is removed and placed on the left-hand side instead of the usual ratchet mechanism provided there.

In mounting the lawn mower on the support, the adjustable gauge roller 25 is first set in the lowermost position and is then received against a seat provided therefor on the table 10 by means of a transverse bar 30 secured to the table, the mower being balanced or supported on the gauge roller by means of a chain or cable 31 engaging the handle 26 of the lawn mower and releasably fastened at its ends to the table 10, as clearly shown in Figures 1 and 2. Preferably the means for releasably fastening the chain includes a chain engaging element or resilient bracket 32 secured to one side of the table 10 and selectively cooperable with the links of the chain 31.

Driving mechanism is provided and as shown in Figure 1, may comprise an adjustable supporting arm 35 having a longitudinal slot 36 therein which receives the shaft 15 on which the supporting arm is adjustably secured by means of a washer 37 and nut 38 threaded on the shaft 15. On the outer end of the supporting arm a driving pulley 39 is rotatably journaled and has fixed thereto a hand crank or lever 40 by which the pulley may be turned. It is obvious that a motor may be utilized instead of the hand crank, if this is desired. A belt 41 is trained over the driving pulley 39 and the overlying traction or ground wheel 17 and constitutes means for transmitting the motion of the driving pulley to the ground wheel.

If desired the driving mechanism shown in Figure 1 may be removed and the convertible hand or foot driving mechanism shown in Figures 2 and 3 may be employed. This convertible driving mechanism includes a pair of clamping members 42 having curved clamping fingers 42$^a$ provided with suitable friction surfaces engageable with the ground wheel 17 and having confronting arms 42$^b$ provided with opposed openings 42$^c$ with which a clamping nut and bolt 43 coacts and opposing bearings 42$^d$ in which a hand lever 44 having a removable hand grip 44$^a$ is releasably secured by means of a set screw 45. These parts of this mechanism constitutes a hand driving mechanism and when it is desired to provide a foot actuated driving mechanism, the hand grip 44$^a$ is removed and one end of a pitman 46 is pivotally connected to the hand lever 44, the other end of the pitman being pivotally connected to a treadle frame 47 journaled in suitable bearings 48 provided therefor in the legs 12 and having a foot plate 49 secured thereto. When the foot actuated driving mechanism is not in use the treadle frame 47 is disconnected from the pitman 46 and is received in seats 50 provided in the legs 12 and is held in these seats by retaining plates 51.

When the hand crank 40, the hand lever 44 or the foot plate 49 of the treadle is actuated the ground wheel is turned and as the ratchet mechanism is reversed, the rotary cutters are caused to traverse the ledger plate in a direction opposite to that in which they normally move with respect thereto. This of itself has a sharpening action but in order to produce a keen edge on both the rotary cutters and the ledger plate it is proposed to feed a powdered abrasive, such as powdered emery, to the ledger plate so that when the rotary cutters move across it, they will carry the powdered emery with them so that it will be effective to grind the desired edges on both the rotary cutters and the ledger plate.

Figure 4:
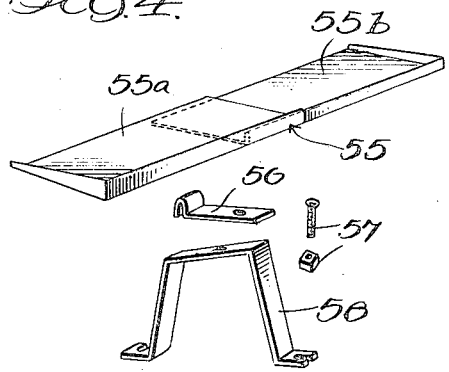
Figure 4 is a similar view of the emery feed board and its support.
Figure 6:
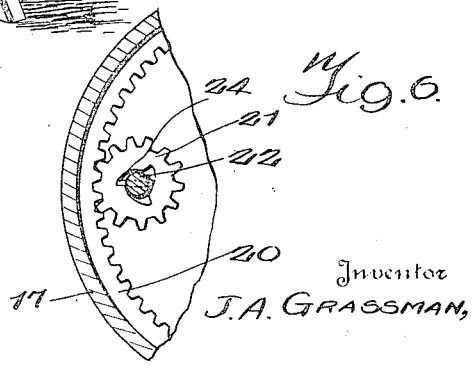
Figure 6 is a view in fragmentary section, showing the ratchet mechanism of the lawn mower reversed.

Means is provided for feeding the powdered abrasive and comprises an extensible feed board 55 (see Fig. 4) including telescoping sections 55$^a$ and 55$^b$ releasably secured by spring clips 56 and nuts and bolts 57 to brackets 58 secured on the table 10. The vibration incident to the moving mechanism is sufficient to cause the powdered emery to travel slowly down the inclined feed board onto the ledger plate. An extensible apron or receiver 59 (see Fig. 5) includes telescoping sections 59$^b$ and is supported in position by hooks 60 engaging the frame 16 of the lawn mower and extending under the cutters to catch the powdered emery after it has exerted its grinding action and preserve it so that it may be utilized over again.

When the apparatus is not in use as a sharpener it may be folded up as shown in Figure 7, with the pair of legs 14 nested within the legs 12 and the table 10 and its frame 11 set down in between the legs. Means is provided for releasably securing the apparatus folded up in this manner and may comprise a spring latch bar 62 constructed of resilient metal and secured at one end, as at 63, to the underside of the table 10 and loosely mounted at its other end on a stud 64. The latch bar 62 has only a limited degree of movement on the stud 64 and the head 64$^a$ of this stud constitutes a fulcrum for the latch bar during the release operation, as will presently appear. At the end adjacent the loose connection 64, the latch bar is offset, as at 65, the outer end of the offset portion being curved or beveled, as at 65$^a$, and the offset portion being provided intermediate its ends with an opening or socket 66 which is adapted to receive a pin 67 carried by the shaft 15 and coacting with the latch bar to effect the locking of the parts in folded position, as shown more especially in Figure 8. Release mechanism is associated with the latch bar and includes an internally threaded bushing 68 set in the table 10 and a threaded operating plug 69 engaged with the bushing and having a tongue 70 adapted to cooperate with a slotted operating tool 71. When it is desired to release the latching mechanism, the operating plug is turned to depress the latch bar 62 and cause it to flex about its fulcrum 64$^a$, whereby the offset portion 65 is moved away from the pin 67 to release the latch mechanism.

Where a lawn mower is to be sharpened, the table 10 and legs 12 and 14 are set up as shown in Figure 1 or 2, and the lawn mower with its ratchet mechanism reversed, is positioned on the table 10 as previously described. The desired driving mechanism is then organized with the ground wheel of the lawn mower and the emery feed board and the emery apron or receiver are next placed in position. When the driving mechanism is actuated after a supply of powdered emery is placed on the feed board, the sharpening or grinding action progresses automatically as the vibration incident to the operation of the machine feeds the abrasive and the reversed ratchet mechanism provides for the proper movement of the rotary cutters across the ledger plate.

I claim:

1. In a sharpening device for lawn mowers, a table, means for supporting the lawn mower on the table, driving mechanism for the cutters of the lawn mower, and an inclined feed board supported on the table and arranged to feed an abrasive to the cutters under the action of the vibration set up by the moving parts of the device.

2. In a sharpening device for lawn mowers, a table, means for supporting the lawn mower on the table, driving mechanism for the cutters of the lawn mower, an inclined feed board supported on the table and arranged to feed an abrasive to the cutters under the action of the vibration set up by the moving parts of the device, and a receiver for collecting the abrasive after it has participated in the grinding action.

3. In a sharpening device for lawn mowers, a table, means for supporting the lawn mower on the table, driving mechanism for the cutters of the lawn mower, an inclined feed board supported on the table and arranged to feed an abrasive to the cutters under the action of the vibration set up by the moving parts of the device, said feed board being laterally extensible and being releasably clamped in adjusted position.

4. In a sharpening device for lawn mowers, a table, means for supporting the lawn mower on the table, driving mechanism for the cutters of the lawn mower, an inclined feed board supported on the table and arranged to feed an abrasive to the cutters under the action of the vibration set up by the moving parts of the device, and a receiver for collecting the abrasive after it has participated in the grinding action, said receiver being laterally extensible.

5. In a sharpening device for lawn mowers having a gauge roller, a table, means for supporting the lawn mower on its roller on said table including a bar fixed to the table and against which the gauge roller abuts and a chain engageable with the handle, and releasably connected with the table at points remote from said bar, and driving mechanism for the lawn mower.

6. A sharpener for lawn mowers comprising a table upon which the lawn mower is mounted, means for maintaining said lawn mower in position on said table and driving mechanism for the cutters of said lawn mower including an adjustable supporting arm, a driving pulley carried thereby, means for actuating said driving pulley and a belt trained over the driving pulley, and the ground wheel of the lawn mower.

7. A sharpener for lawn mowers including a table upon which said lawn mower is mounted, means for maintaining said lawn mower in position on said table, driving mechanism for the rotary cutter of the lawn mower including a hand crank connected with the ground wheel and a foot treadle releasably connected with the hand crank whereby the ground wheel may be selectively driven by hand or foot power.

JOHN ADAM GRASSMAN.